United States Patent [19]
Hirabayashi

[11] Patent Number: 5,956,153
[45] Date of Patent: Sep. 21, 1999

[54] CODING METHOD AND APPARATUS

[75] Inventor: Yasuji Hirabayashi, Kawasaki, Japan

[73] Assignee: Canon Kabushiki Kaisha, Tokyo, Japan

[21] Appl. No.: 08/427,835

[22] Filed: Apr. 26, 1995

Related U.S. Application Data

[63] Continuation of application No. 08/073,052, Jun. 8, 1993, abandoned.

[30] Foreign Application Priority Data

Jun. 10, 1992 [JP] Japan .................................... 4-150396

[51] Int. Cl.⁶ .................................................... H04N 1/415
[52] U.S. Cl. ........................................ 358/433; 358/261.3
[58] Field of Search .................................... 358/426, 427, 358/432, 433, 261.1, 261.2, 261.3, 261.4, 262.1

[56] References Cited

U.S. PATENT DOCUMENTS

| | | | |
|---|---|---|---|
| 4,972,260 | 11/1990 | Fujikawa et al. | 358/136 |
| 5,063,459 | 11/1991 | Nakatani et al. | 358/404 |
| 5,086,487 | 2/1992 | Katayama et al. | 382/56 |
| 5,107,345 | 4/1992 | Lee | 358/432 |
| 5,121,216 | 6/1992 | Chen et al. | 358/432 |
| 5,144,426 | 9/1992 | Tanaka et al. | 358/133 |
| 5,237,410 | 8/1993 | Inoue | 358/136 |

FOREIGN PATENT DOCUMENTS

| | | | |
|---|---|---|---|
| 0330455 | 8/1989 | European Pat. Off. | H04N 7/137 |
| 0424060 | 4/1991 | European Pat. Off. | H06N 7/137 |
| 0476603 | 3/1992 | European Pat. Off. | H04N 7/13 |

OTHER PUBLICATIONS

Patent Abstracts of Japan, vol. 15, No. 334 (E–1104), Aug. 26, 1991.
Patent Abstracts of Japan, vol. 15, No. 494 (E–1145), Dec. 13, 1991.
Patent Abstracts of Japan, vol. 16, No. 246 (E–1212), Jun. 5, 1992.
Patent Abstracts of Japan, vol. 16, No. 530 (E–1287), Oct. 30, 1992.
IEE Transactions on Acoustics, Speech and Signal Processing, vol. 37, No. 11, Nov., 1989, New York, US, pp. 1743–1749, K.N. Ngan et al.: 'Adaptive cosine transform coding of images in perceptual domain'.

*Primary Examiner*—Thomas D. Lee
*Assistant Examiner*—Jerome Grant, II
*Attorney, Agent, or Firm*—Fitzpatrick, Cella, Harper & Scinto

[57] ABSTRACT

Image coding method and apparatus for improving image quality by controlling amount of encoded image data in variable-length coding. The image encoding apparatus comprising: input unit for inputting image data for each block having a first size; encoding unit for encoding the image data for each block and generating encoded image data; and controlling unit for controlling an encoding parameter for each block in accordance with amount of the encoded image data, wherein controlling unit controls the encoding parameter further in accordance with the position of the block to be encoded.

19 Claims, 15 Drawing Sheets

| 1 | 2 | 3 | 4 | 5 | 6 |
|---|---|---|---|---|---|
| 7 | 8 | 9 | 10 | 11 | 12 |
| 13 | 14 | 15 | 16 | 17 | 18 |
| 19 | 20 | 21 | 22 | 23 | 24 |

| 0 | 0 | 0 | 0 | 0 | 0 |
|---|---|---|---|---|---|
| 0 | 0 | 1 | 1 | 0 | 0 |
| 0 | 1 | 1 | 1 | 1 | 0 |
| 1 | 1 | 1 | 1 | 1 | 1 |

| INDEX | OUTPUT BIT |
|---|---|
| 0 | 0.5D |
| 1 | 1.5D |

| 1 | 2 | 3 | 4 | 5 | 6 |
|---|---|---|---|---|---|
| 7 | 8 | 9 | 10 | 11 | 12 |
| 13 | 14 | 15 | 16 | 17 | 18 |
| 19 | 20 | 21 | 22 | 23 | 24 |

| 0 | 0 | 0 | 0 | 0 | 0 |
|---|---|---|---|---|---|
| 0 | 2 | 3 | 3 | 2 | 0 |
| 1 | 3 | 3 | 3 | 3 | 1 |
| 1 | 2 | 2 | 2 | 2 | 1 |

| INDEX | OUTPUT BIT |
|---|---|
| 0 | D |
| 1 | 2D |
| 2 | 3D |
| 3 | 6D |

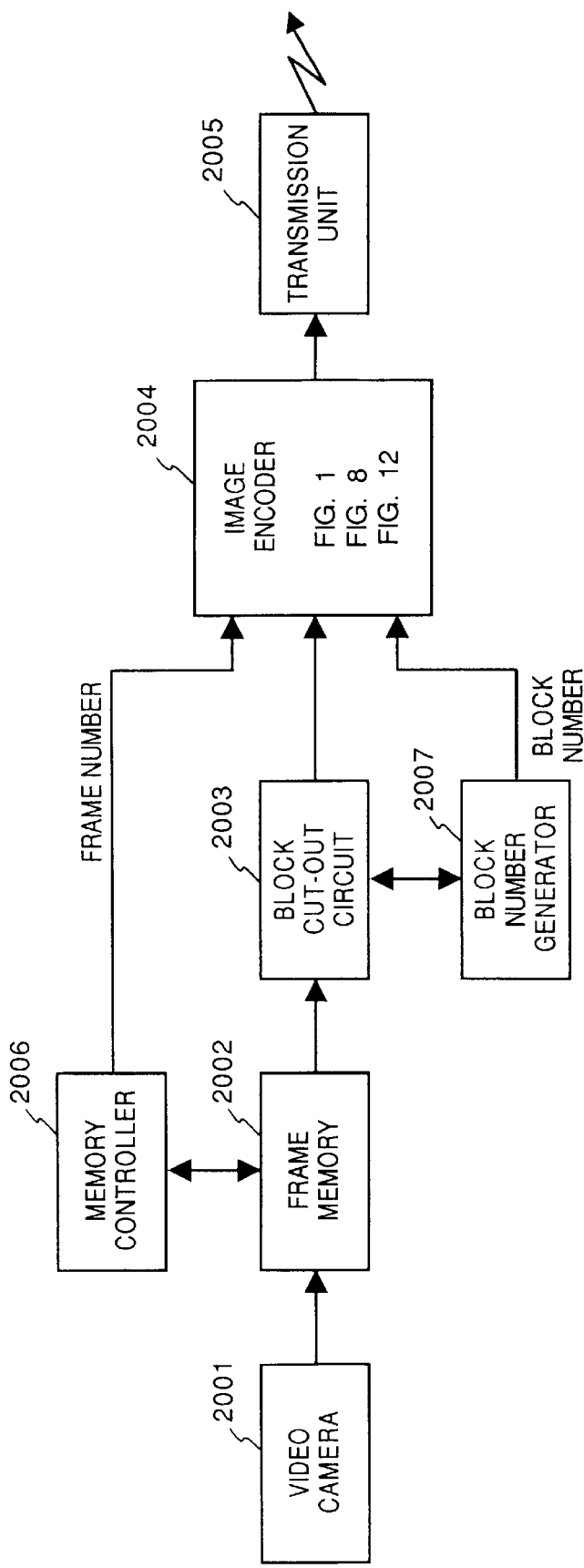

A BLOCK HAVING A SECOND SIZE
(ONE OF TWENTY-FOUR DIVIDED AREAS)

A BLOCK HAVING A FIRST SIZE
(8 x 8 PIXEL BLOCK)

CODING METHOD AND APPARATUS

This application is a continuation-in-part of application Ser. No. 08/073,052 filed Jun. 8, 1993 now abandoned.

BACKGROUND OF THE INVENTION

1. [Field of the Invention]

The present invention relates to coding method and apparatus and, more particularly, to coding method and apparatus for encoding moving images.

2. [Related Art]

Block coding method using inter-frame difference has been proposed as a moving image coding method. FIG. 6 shows a moving image encoding apparatus disclosed in Japanese Patent Application No. 4-64555.

In FIG. 6, reference numeral 1001 denotes an adder, into which block data in one spatial position of an image is inputted from one side and block data in an identical position on real space of a preceding image from frame memory 1004 is inputted from the other side. The adder 1001 subtracts the block data of the preceding image from the block data of the present image and outputs the subtraction result.

Numeral 1002 denotes a quantizer which performs discrete cosine transformation (DCT) to the difference block data inputted from the adder 1001, then performs zigzag scanning to the DCT data, and linearly quantizes the scanned data using a quantization step value (hereinafter, referred to as "g-value") to output quantized data.

Numeral 1003 denotes an inverse quantizer which inversely quantizes the quantized data inputted from the quantizer 1002, then performs inverse-zigzag scanning to the inverse-quantized data, and performs inverse-DCT to the scanned data to output spatial difference data.

The spatial difference data is inputted from the inverse quantizer 1003 into the frame memory 1004 in which the input data is added to already stored image data and stored as whole image data of a preceding image.

Numeral 1005 denotes an encoder which encodes a g-value inputted from g-value determination unit 1007, quantized data inputted from the quantizer 1002, a frame number and a block number. Further, the encoder 1005 time-divisionally multiplexes the code data and outputs the multiplexed data.

Numeral 1006 denotes a buffer which outputs a predetermined amount of the input multiplexed data from the encoder 1005 at a time, at transmission speed appropriate to transmission path 1008.

Numeral 1007 denotes a g-value determination unit which monitors the buffer 1006 and determines a g-value in accordance with the amount of data stored in the buffer 1006. The g-value determined by the g-value determination unit 1007 is transmitted to the encoder 1005, the quantizer 1002 and the inverse quantizer 1003. Further, if the determined g-value is different from a preceding g-value, the g-value determination unit 1007 transmits an update signal indicative of updating of g-value to the encoder 1005.

Next, the operation of the g-value determination unit 1007 will be described below.

FIG. 7 is a diagram showing the operation of the buffer 1006. The buffer 1006 has a buffer size represented by bit-rate/frame-rate. The code data inputted from input side 701 (left side in FIG. 7) is sequentially stored at an output side (right side in FIG. 7) as data 702, and sequentially outputted from output side 703 from the initially-stored data at a fixed speed.

The g-value determination unit 1007 monitors the data stored in the buffer 1006, and if the amount of data is close to empty status, the g-value determination unit 1007 determines a smaller g-value for generating more code data, while it determines a greater g-value for suppressing generation of code data if the stored data amount is close to full status. As shown in FIG. 7, if the g-value range is 2 to 64, the g-value determination unit 1007 outputs a g-value 2–64 in accordance with the storing status of the buffer 1006.

In the above moving image encoding apparatus, average coding amount per frame is limited based on the buffer size of the buffer 1006 under the g-value control by the g-value determination unit 1007. Accordingly, it is possible to output code data at a constant rate by the conventional moving image encoding apparatus.

However, the conventional apparatus has the following problem. An image usually includes a block having a large amount of information (e.g., a person performing conspicuous action in a moving image) and a block having a small amount of information (e.g., background in a moving image). When the conventional apparatus encodes the block of small information amount, coding amount is small, however, as output amount from the buffer 1006 is fixed, buffer amount gradually decreases. In order to stable the buffer amount, the g-value determination unit 1007 outputs a small g-value for generating more code data, and the buffer amount is stabilized at a point where the code-generating amount and the output amount balance.

On the other hand, when the block of large information amount is encoded, as the coding amount tends to exceed the output amount, the buffer amount gradually increases. Accordingly, the g-value determination unit 1007 outputs a greater g-value to suppress generation of code data. As a result, the buffer 1006 output is stabilized by suppressing generation of code data.

The above arrangement means fine quantization performed to a block having a small amount of information while rough quantization performed to a block having a large amount of information, which results in extreme degradation of image quality.

This problem may also occurs in still-image coding, especially when moving image coding is applied to a device such as a visual telephone.

SUMMARY OF THE INVENTION

The present invention has been made to solve the above problem, and has as its object to improve image quality in controlling the amount of encoded image data.

According to the present invention, the foregoing object is attained by providing an image encoding apparatus having a function for controlling an amount of encoded image data, comprising: input means for inputting image data for each block having a first size; encoding means for encoding the image data for each block and generating encoded image data; and controlling means for controlling an encoding parameter for each block in accordance with amount of the encoded image data, wherein the controlling means controls the encoding parameter further in accordance with a position of a block to be encoded.

It is another object of the present invention to improve image quality of an important portion of an image by allotting more coding amount to the portion.

Further object of the present invention is to provide a moving image coding method having a novel function.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 17 is a block diagram showing the system configuration of the present invention.

DETAILED DESCRIPTION OF THE PREFERRED EMBODIMENTS

Preferred embodiments of the present invention will be described in detail in accordance with the accompanying drawings.

[First Embodiment]

Figure 1:
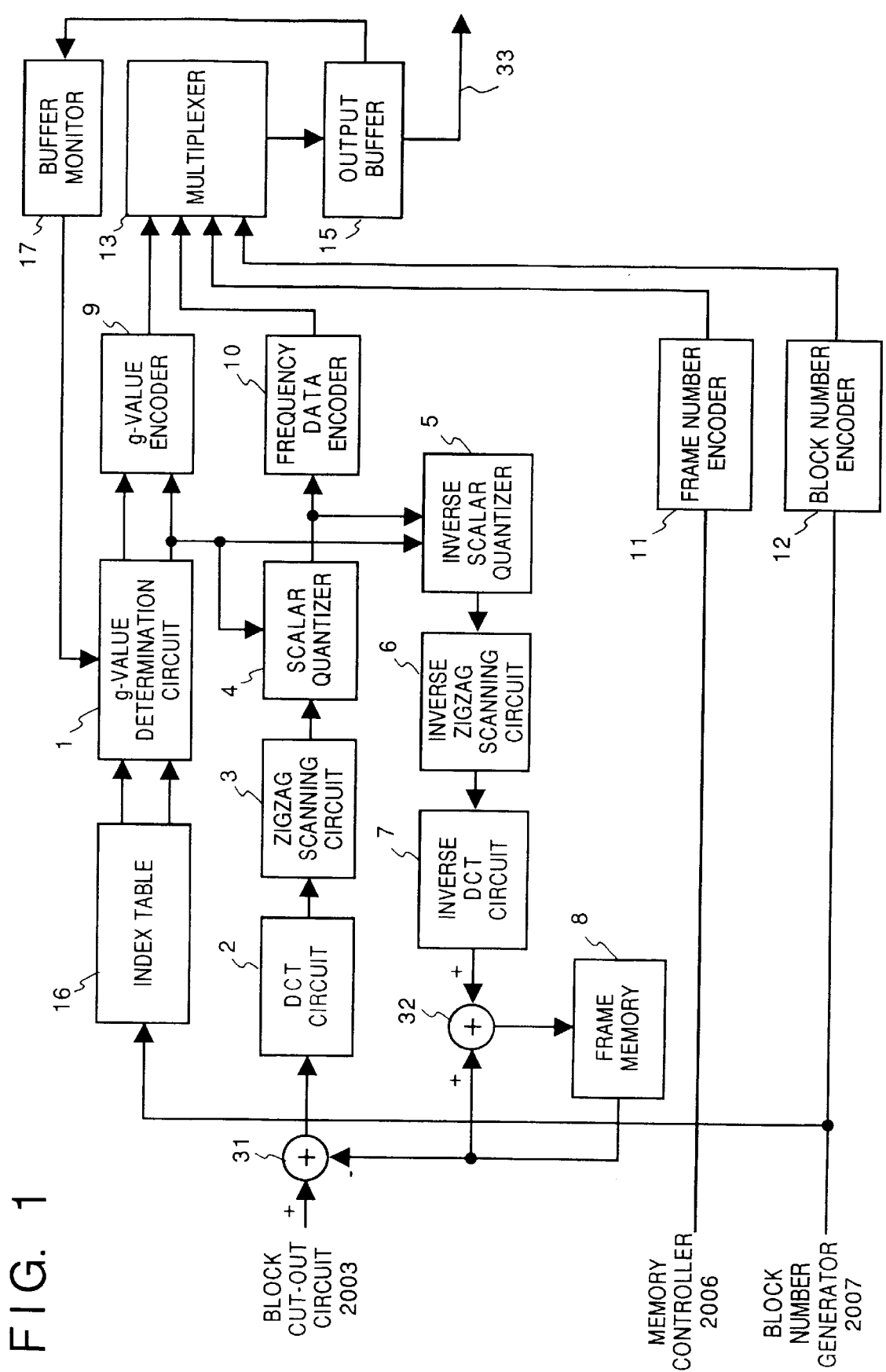
FIG. 1 is a block diagram showing the configuration of a moving image encoding apparatus according to a first embodiment of the present invention.

FIG. 1 is a block diagram showing the configuration of the moving image encoding apparatus according to the first embodiment. In FIG. 1, reference numeral 31 is an adder into which block data in a spatial position of an image is inputted from one side and block data in an identical spatial position of a preceding image is inputted from the other side from a frame memory 8 to be described later. The adder 31 subtracts the block data of the preceding image from the block data of the present image and outputs the subtraction result.

Numeral 2 denotes a DCT circuit which performs discrete cosine transformation to the difference data inputted from the adder 31 and outputs frequency component data. The DCT circuit 2 performs the DCT transformation in 8×8 pixel block units.

Numeral 3 denotes a zigzag scanning circuit which performs zigzag scanning of the matrix of frequency component data inputted from the DCT circuit 2 to convert the data into one-dimensional data.

Numeral 4 denotes a scalar quantizer which linearly quantizes the one-dimensional data array inputted from the zigzag scanning circuit 3 using a quantization step value (hereinafter, referred to as "g-value").

Numeral 10 denotes a frequency data encoder which performs Huffman coding to the quantized data inputted from the scalar quantizer 4.

Numeral 5 denotes an inverse scalar quantizer which inversely quantizes the quantized data inputted from the scalar quantizer 4 to one-dimensional frequency data array again.

Numeral 6 denotes an inverse zigzag scanning circuit which converts the one-dimensional frequency data array inputted from the inverse scalar quantizer 5 into matrix data.

Numeral 7 denotes an inverse DCT circuit which converts the matrix frequency component data inputted from the inverse zigzag scanning circuit 6 to spatial difference data.

The spatial difference data outputted from the inverse DCT circuit 7 is added to previously stored image data by an adder 32, and the entire image data of a preceding image is stored into the frame memory 8.

Numeral 11 denotes a frame number encoder, and 12, a block number encoder, which respectively encode input frame number and block number.

Numeral 13 denotes a multiplexer which performs time-division multiplexing to the code data from g-value encoder 9 to be described later, code data from the frequency data encoder 10, code data from the frame number encoder 11 and code data from the block number encoder 12, and outputs the multiplexed data.

Numeral 15 denotes an output buffer which outputs a predetermined amount of the data inputted from the multiplexer 13 at a time, at a transmission speed corresponding to transmission path 33 by outputting a predetermined amount of data at a time.

Numeral 17 denotes a buffer monitor which monitors the output buffer 15 and outputs information indicative of the amount of data stored in the output buffer 15.

Figures 2, 3A, 3B:
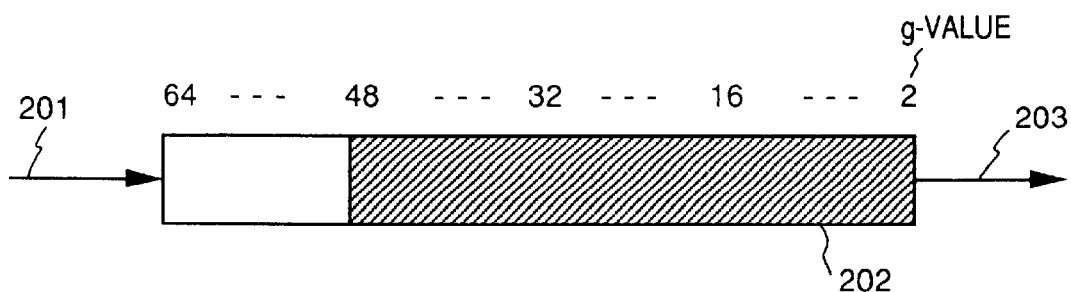
FIG. 2 illustrates operation of an output buffer in the first embodiment.
FIGS. 3A and 3B illustrate an input-output example of an index table in the embodiment.

FIG. 2 illustrates the operation of the output buffer 15 which has buffer size represented by bit-rate/frame-rate. In FIG. 2, coded data is inputted from input side (left side) 201 and is stored at an output side (right side). The stored data is sequentially outputted from outside 203 from the initially-stored data at a fixed speed. More specifically, the buffer monitor 17 monitors the amount of stored data in the output buffer 15 and outputs information corresponding to the amount.

Numeral 16 denotes an index table stored in such as a ROM or RAM. When a block number is inputted, an index of an area to which the corresponding block belongs is outputted.

FIGS. 3A and 3B show an input-output example of the index table 16. FIG. 3A shows block numbers of blocks, and FIG. 3B shows indices of the blocks. An index corresponding to an input block number is outputted from the index table 16. For example, if block number "13" is inputted, index "0" is outputted, and if block number "23" is inputted, index "12" is outputted.

It should be noted that an index is indicative of the degree of importance of each of twenty-four areas (blocks) forming one image, and the index "2" indicates the most important area.

For example, in a moving image of a visual telephone, only a speaker moves and the background is not changed. In this case, the portion of the speaker has the highest importance, and the background portion has the lower importance. Accordingly, an area in which the speaker will be displayed is determined in advance, and index "2" is allotted to that portion, while index "0" is allotted to the other portion with lower possibility of displaying the speaker. This arrangement eliminates problems caused by the coding amount control, and thus enables coding in accordance with importance degree of image.

In this embodiment, one image is divided into twenty-four areas and one of three kinds of indices ("2", "1" or "0") is allotted to each area. However, the present invention is not limited to this arrangement as far as the number of divided area is plural. Further, the number of indices can be changed.

In FIG. 1, reference numeral 1 denotes a g-value determination circuit; 9, a g-value encoder. The g-value determination circuit 1 determines a g-value based on an index inputted from the index table 16 and stored data information inputted from the buffer monitor 17, and transmits the determined g-value to the g-value encoder 9, the scalar quantizer 4 and the inverse scalar quantizer 5. Further, if the g-value is different from a preceding g-value, the g-value determination circuit 1 transmits an update signal indicative of updating of g-value to the g-value encoder 9. The g-value encoder 9 encodes the information inputted from the g-value determination circuit 1 and transmits code data to the multiplexer 13.

Next, the operation of the g-value determination circuit 1 will be described below with reference to FIG. 4 which is a block diagram showing the construction of the g-value determination circuit 1.

Figure 4:
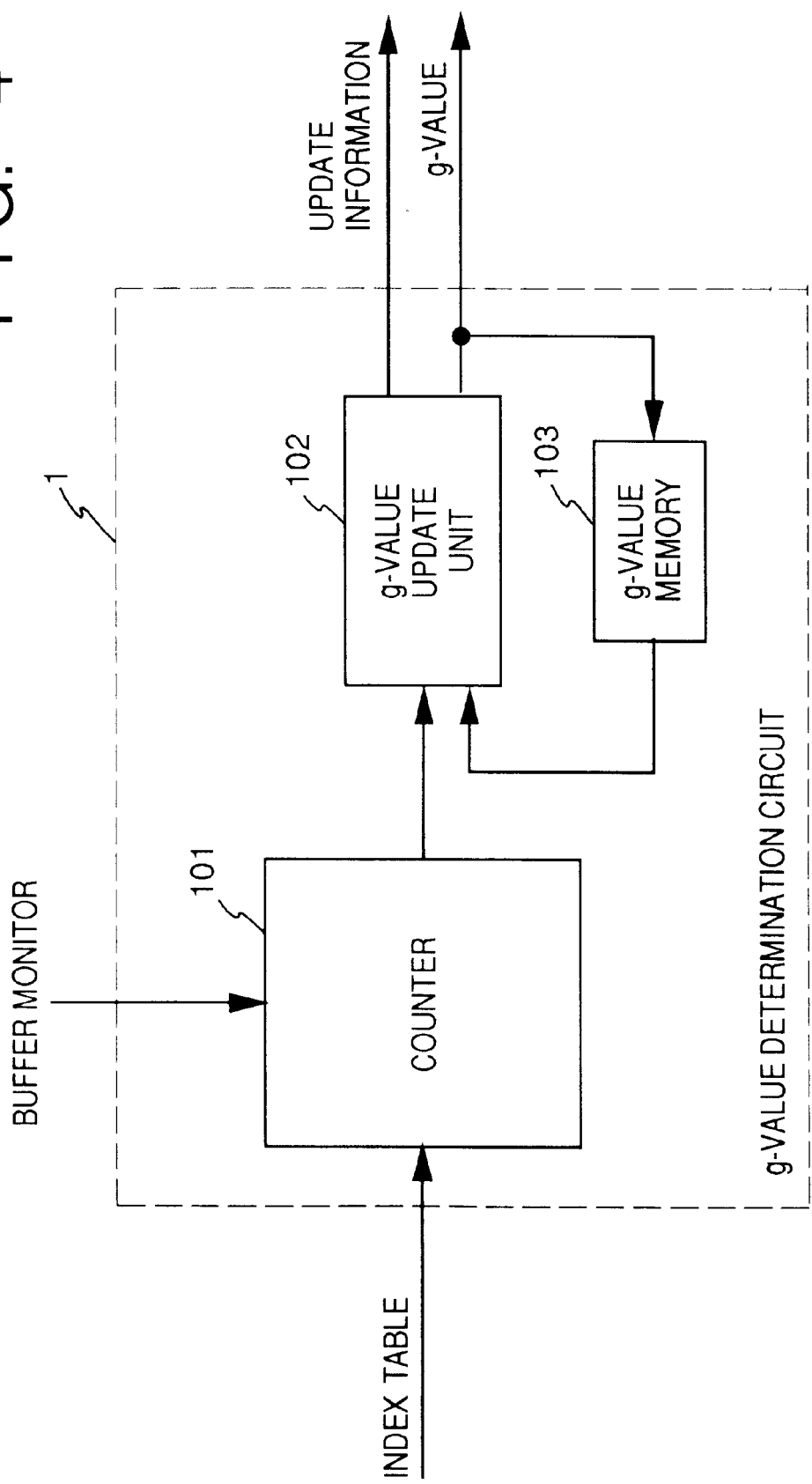
FIG. 4 is a block diagram showing the construction of a g-value determination circuit in the embodiment.

In FIG. 4, reference numeral 101 denotes a g-value table; 102, a g-value update unit; and 103, a g-value memory.

The g-value table 101 outputs a g-value based on an index inputted from the index table 16 and the stored data information inputted from the buffer monitor 17.

Figure 5:
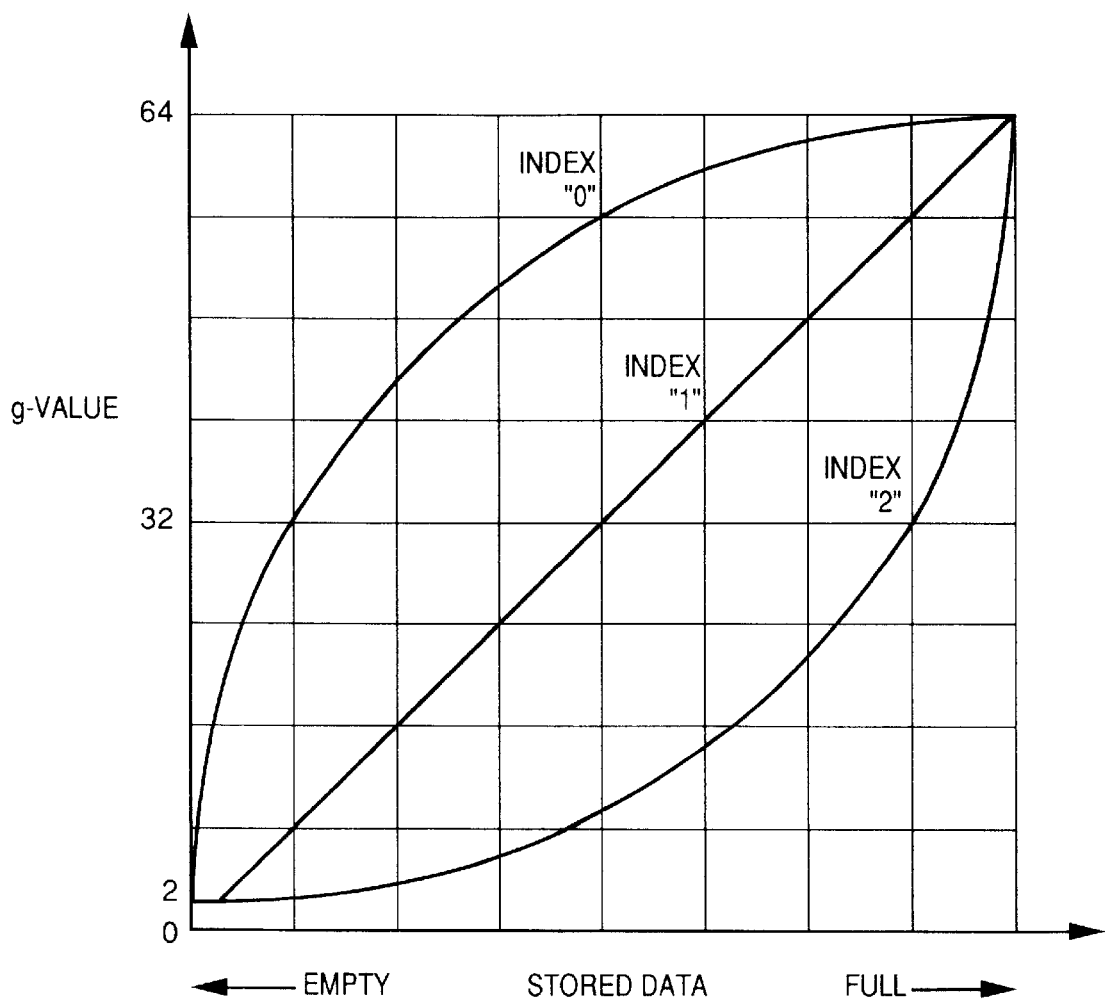
FIG. 5 illustrates an input-output example of a g-value table in the embodiment.
Figure 6:
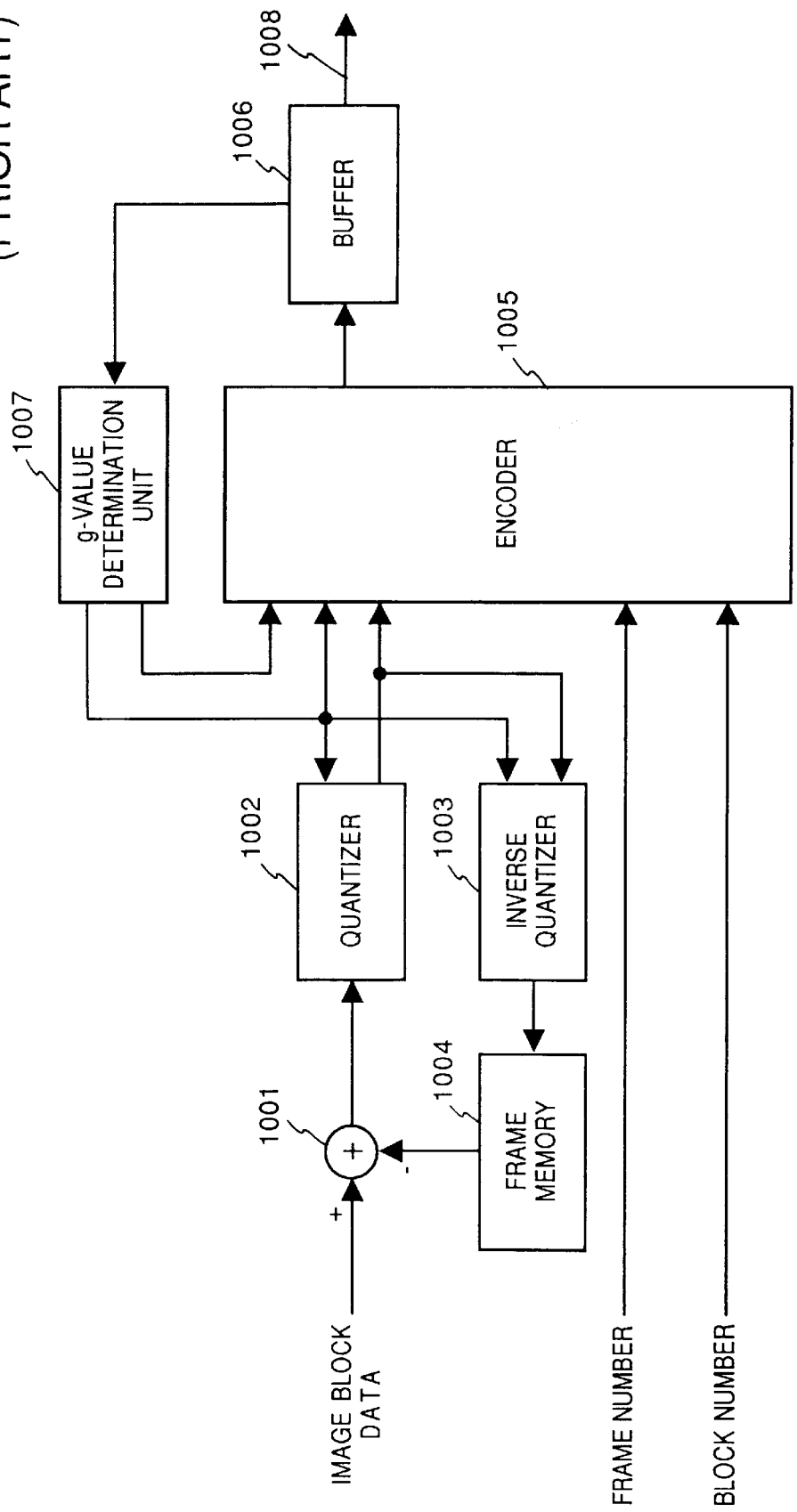
FIG. 6 is a block diagram showing the configuration of a prior art moving image encoding apparatus.
Figure 7:
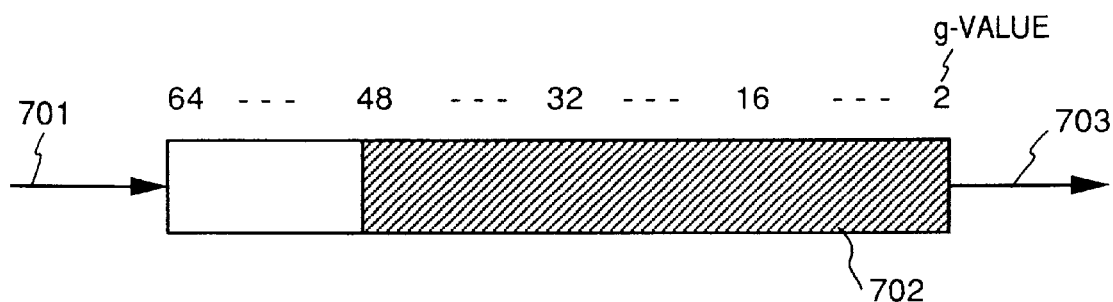
FIG. 7 illustrates operation of a prior art buffer.

FIG. 5 illustrates an input-output example of the g-value table 101, where a g-value (2 to 64 in vertical axis in FIG. 5) is outputted in accordance with buffer storing status information (horizontal axis in FIG. 5).

The g-value update unit 102 compares a g-value inputted from the g-value table 101 with a preceding g-value stored in the g-value memory 103, and outputs update information "0" if the values are the same, while outputs update information "1" if the values are different. Note that a value outputted from the g-value update unit is inputted into the g-value memory 103 as well as into the scalar quantizer 4, the inverse scalar quantizer 5 and the g-value encoder 9.

As described above, the g-value determination circuit 1 determines a g-value in accordance with an input index and data stored status of the buffer 15. If the amount of the data 202 in the output buffer 15 is close to empty status, the g-value determination circuit 1 determines a small g-value for generating more code data, while it determines a large g-value for suppressing generation of code data if the amount of the data 202 is close to full status.

That is, the g-value determination circuit 1 exponentially increases g-value with respect to an area of index "2" shown in FIG. 3B, and linearly increases g-value with respect to an area of index "1" in FIG. 3B, further, logarithmically increases g-value with respect to an area of index "0" in FIG. 3B, in accordance with stored data status of the output buffer 15.

Accordingly, in this embodiment, indices are determined in accordance with the characteristics of the blocks of one image. An index of a block having relatively large amount of information is "2", an index of a block having relatively small amount of information is "0", and an index of a block having about intermediate amount of information is "1". Quantization is performed to each block with an appropriate g-value.

It should be noted that the above description including the explanation of FIG. 5 has been made assuming the g-value as 2 to 64 and the index as 0 to 2, however, the present invention is not limited to these values.

As described above, according to this embodiment, average coding amount per one image is limited to the amount corresponding to the size of the output buffer 15, and code data can be outputted at approximately fixed rate by the g-value control by the g-value determination circuit 1. Further, indices are set to blocks composing one image in accordance with characteristics of the respective blocks, and quantization can be performed to each block with a g-value corresponding to its index. According to this embodiment, with respect to a block having a large amount of information, the g-value is exponentially controlled to avoid rough quantization. Contrary, with respect to a block having a small amount of information, the g-value is logarithmically controlled to avoid fine quantization. In this manner, moving image coding without degradation of image quality can be realized.

[Second Embodiment]

Next, the second embodiment of the present invention will be described below.

Figure 8:
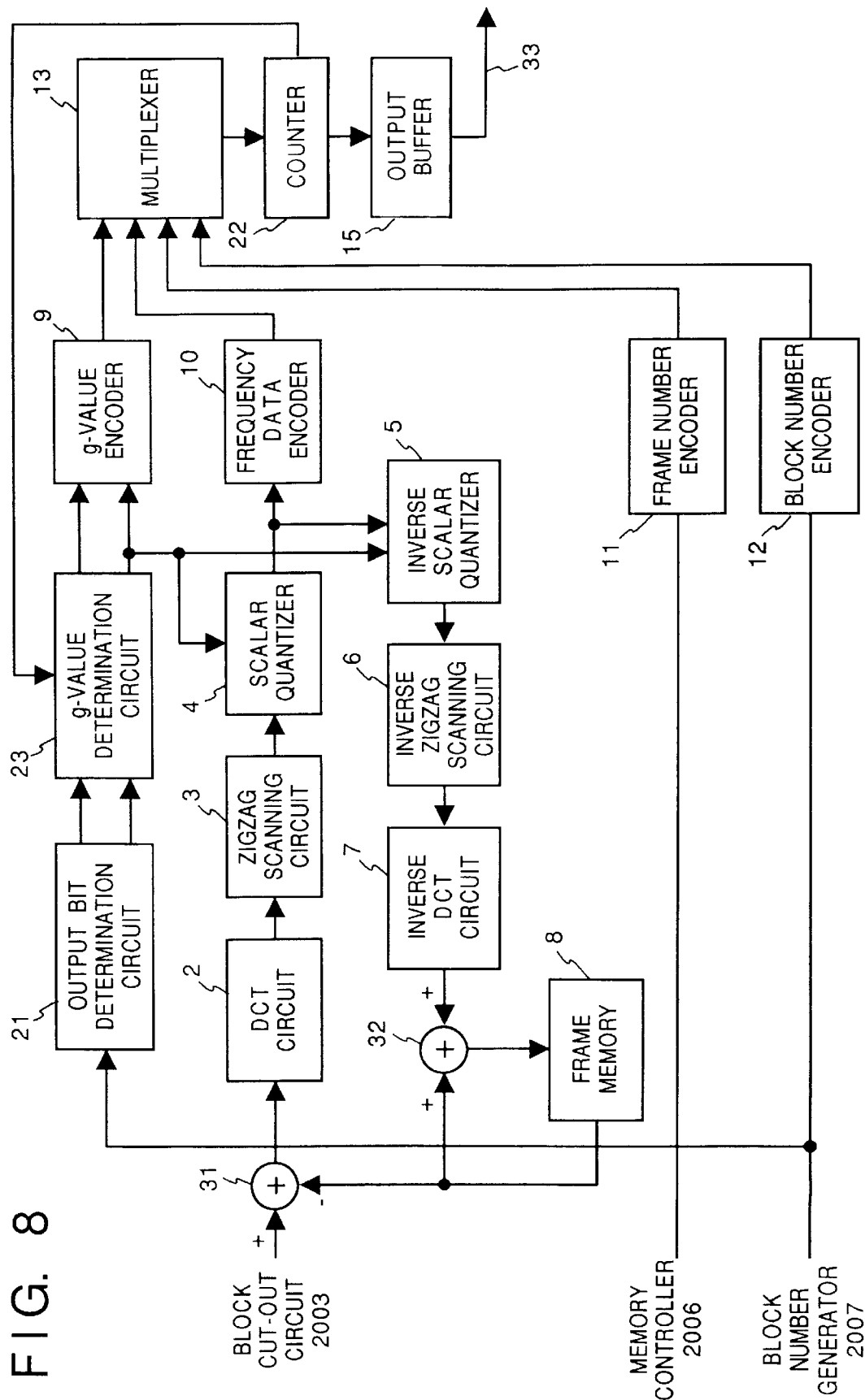
FIG. 8 is a block diagram showing the configuration of an encoding apparatus according to a second embodiment of the present invention.

FIG. 8 is a block diagram showing the configuration of an encoding apparatus according to the second embodiment. It should be noted that the encoding apparatus shown in FIG. 8 has a similar configuration to that of the first embodiment shown in FIG. 1, however, the index table 16 and the buffer monitor 17 are omitted, and output bit determination circuit 21 and counter 22 are added to the configuration. Further, the construction of the g-value determination circuit 23 is different from that of the g-value determination circuit 1 in the first embodiment. The other elements approximately correspond to those in the first embodiment, therefore, the like elements have the same reference numerals and the explanations of these elements will be omitted.

In FIG. 8, the output bit determination circuit 21 determines the number of output bits based on an input block number and transmits the number of output bits corresponding to the degree of importance of the block to the g-value determination circuit 23.

The counter 22 counts the amount of generated code per block and transmits a count value to the g-value determination circuit 23.

The g-value determination circuit 23 has an internal counter, to be described in detail later, for counting up the count value from the counter 22 and counting down the number of bits from the output bit determination circuit 21. The g-value determination circuit 23 transmits the g-value determined based on the count value of the inner counter to the scalar quantizer 4, the inverse scalar quantizer 5 and the g-value encoder 9.

Figures 9, 10A, 10B, 10C:
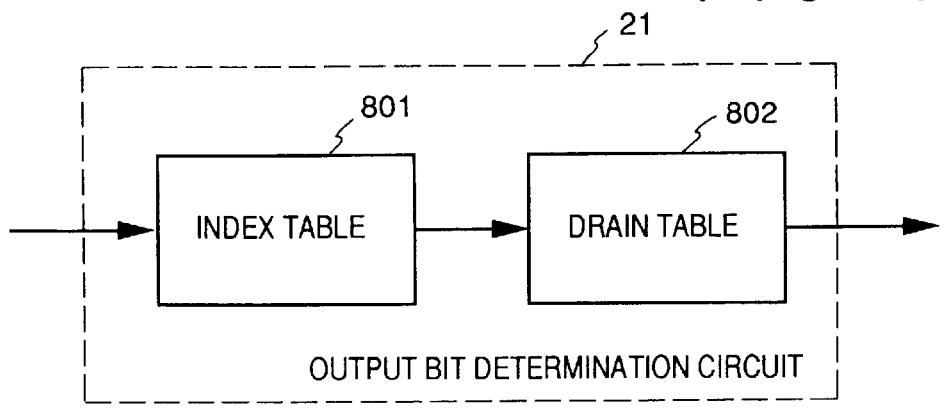
FIG. 9 is a block diagram showing the construction of an output bit determination circuit in the second embodiment.
FIGS. 10A to 10C illustrate an input-output example of the output bit determination circuit.

FIG. 9 is a block diagram showing the construction of the output bit determination circuit 21.

In FIG. 9, reference numeral 801 denotes an index table. When a block number is inputted, an index of the area to which the corresponding block belongs is outputted from the index 801. Numeral 802 denotes a drain table from which the number of output bits corresponding to an index inputted from the index table 801 is outputted.

FIGS. 10A to 10C illustrate an input-output example of the output bit determination circuit 21. FIG. 10A shows block numbers of blocks; FIG. 10B, indices of the blocks; and FIG. 10C, the numbers of output bits corresponding to the indices. An index corresponding to an input block number is outputted from the index table 801, and the number of output bits corresponding to the input index is outputted from the drain table 802.

For example, if block number "13" is inputted, index "0" is outputted from the index table 801, and the number of output bits "0.5D" is outputted from the drain table 802. Note that "D" of the number of output bits means "bit-rate/frame-rate/number of blocks". If block number "23" is inputted, index "1" is outputted from the index table 801, and the number of output bits "1.5D" is outputted from the drain table 802.

The above description is for a case where an image is divided into twenty-four areas and where one of two types of indices ("1" or "0") is allotted. However, the number of divided areas is not limited to twenty-four, as long as one image is divided into plural areas.

Next, the operation of the g-value determination circuit 23 will be described below with reference to FIG. 11 which is a block diagram showing the construction of the g-value determination circuit 23.

Figure 11:
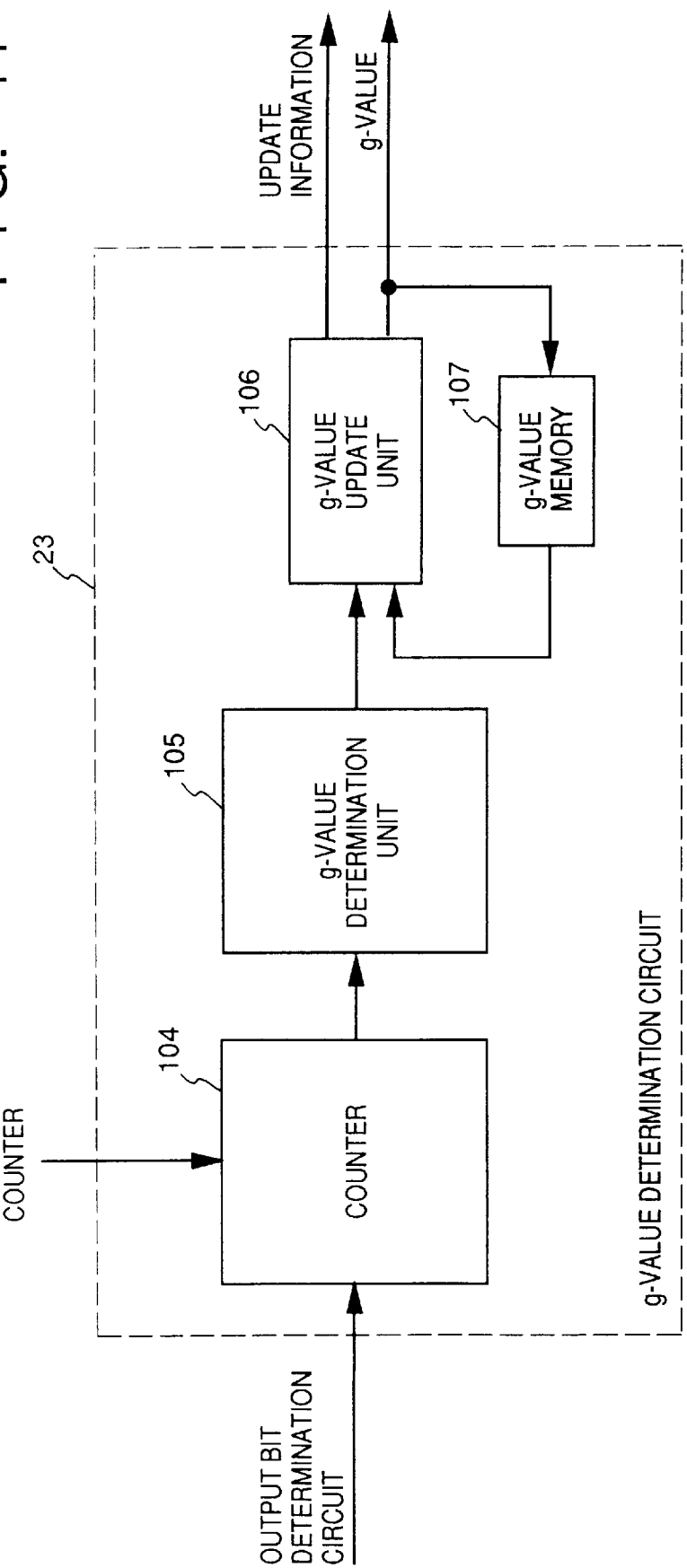
FIG. 11 is a block diagram showing the configuration of a g-value determination circuit in the second embodiment.

In FIG. 11, reference numeral 104 denotes a counter; 105, a g-value determination unit; 106, a g-value update unit; and 107, a g-value memory.

The counter 104 counts up a count value from the counter 22, and counts down the number of output bits from the output bit determination circuit 21.

The g-value determination unit 105 outputs a g-value based on the count value inputted from the counter 104.

The g-value update unit 106 compares the g-value inputted from the g-value determination unit 105 and a preceding g-value stored in the g-value memory 107, and outputs update information "0" if the values are the same, while outputs "1" if the values are different. Note that the g-value outputted from the g-value update unit 106 is inputted into the g-value memory 107 as well as into the scalar quantizer 4, the inverse scalar quantizer 5, and the g-value encoder 9.

As described above, the g-value determination circuit 23 determines a small g-value for generating more code data if code generating amount per one block is small, while it determines a large g-value for suppressing generation of code data if the code generating amount per one block is large. Further, the g-value determination circuit 23 allots an index in accordance with characteristic of each block, for example, it allots index "1" to a block having comparatively large amount of information, while it allots index "0" to a block having comparatively small amount of information (e.g., the background in a moving image) for performing quantization to each block with an appropriate g-value.

It should be noted that in the above description, an index is "0" or "1", however, the present invention is not limited to this arrangement as far as the number of indices is plural.

According to the second embodiment, the number of output bits for an image area having small amount of information is made small and the number of output bits for an image area having a large amount of information is made large by the g-value control by the g-value determination circuit 23, so that more code data can be provided to a block having a large amount of information. Accordingly, rough quantization to a block having a large amount of information can be avoided, inversely, fine quantization to a block having a small amount of information can be avoided. In this manner, moving image coding without degradation of image quality can be realized.

[Third Embodiment]

Next, the third embodiment of the present invention will be described below.

Figure 12:
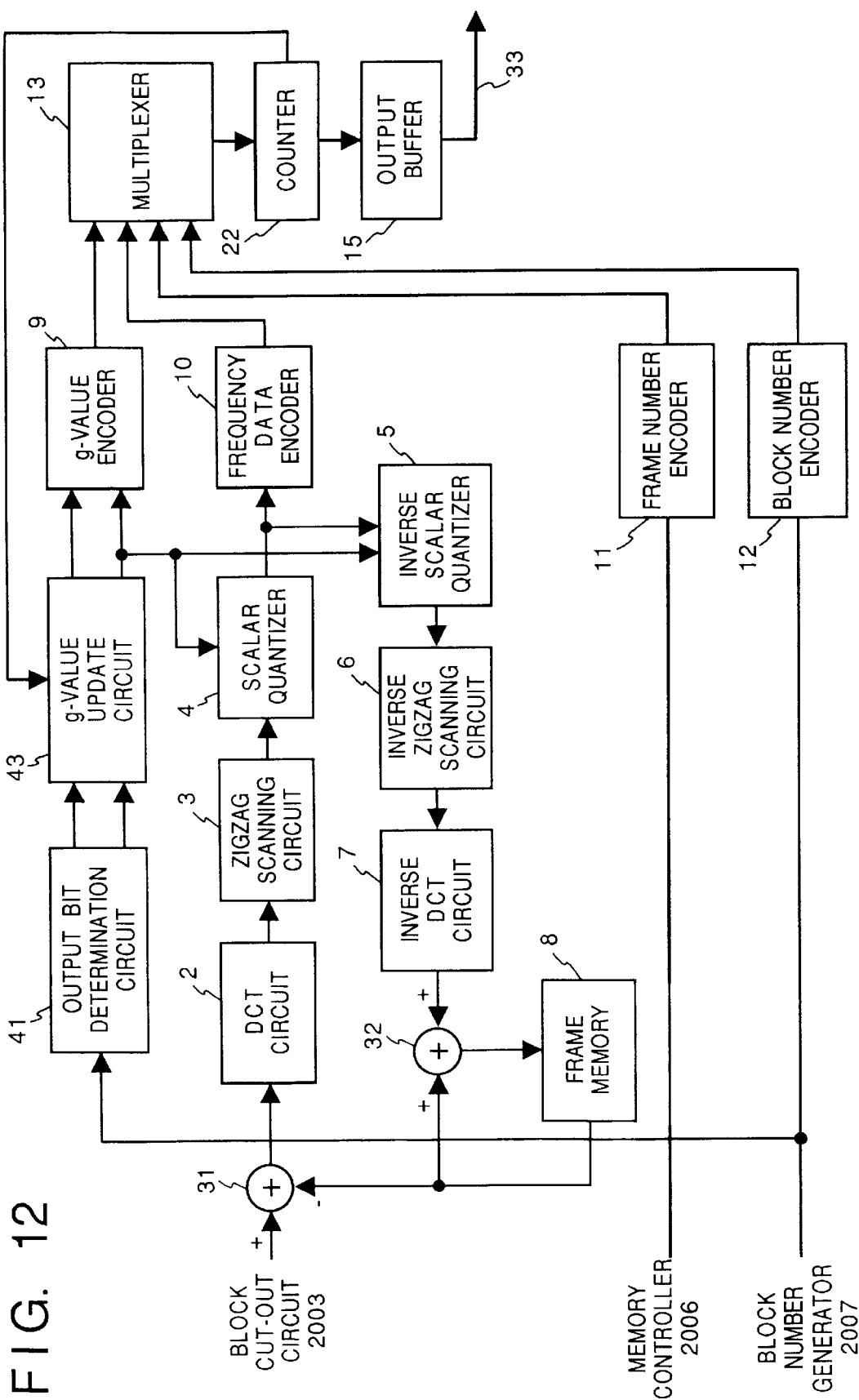
FIG. 12 is a block diagram showing the configuration of an encoding apparatus according to a third embodiment of the present invention.

FIG. 12 is a block diagram showing the configuration of an encoding apparatus according to the third embodiment. It should be noted that in FIG. 12, the configuration of the output bit determination circuit and that of the g-value determination circuit in the third embodiment are different from those in the second embodiment. The other element are approximately similar to those in the first and second embodiments, and therefore, these elements have the same reference numerals and the explanations of these elements will be omitted.

In FIG. 12, reference numeral 41 denotes the output bit determination circuit which determines the number of output bits in accordance with an input block number, and transmits the number of output bits corresponding to importance degree of the block and an index allotted to the block to g-value determination circuit 43.

The g-value determination circuit 43 to be described in detail later has a counter which counts up a count value from the counter 22 and counts down the number of output bits from the output bit determination circuit 41. The g-value determination circuit 43 determines a g-value based on the count value of the internal counter and the index inputted from the output bit determination circuit 41, and transmits the determined g-value to the scalar quantizer 4, the inverse scalar quantizer 5 and the g-value encoder 9.

Figures 13, 14A, 14B, 14C:
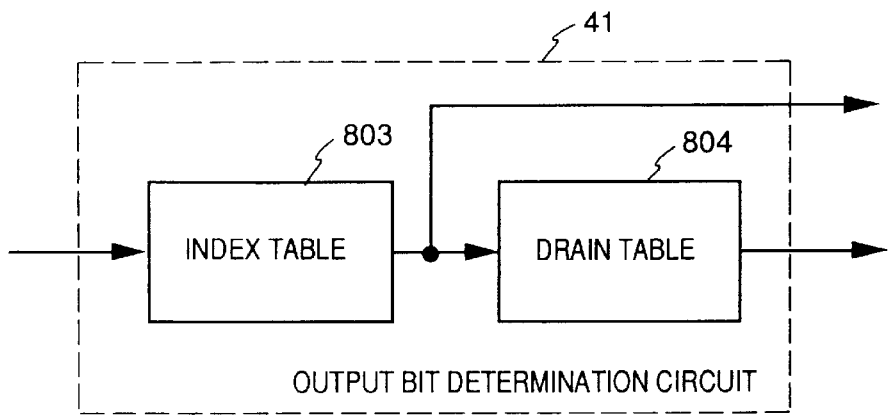
FIG. 13 is a block diagram showing the construction of an output bit determination circuit in the third embodiment.
FIGS. 14A to 14C illustrate an input-output example of the output bit determination circuit in the third embodiment.

FIG. 13 is a block diagram showing the construction of the output bit determination circuit 41.

In FIG. 13, reference numeral 803 denotes an index table; and 804, a drain table. When an block number is inputted, an index of an area to which the corresponding block belongs is outputted from the index table 803, and the number of output bits corresponding to the input index is outputted from the drain table 804.

FIGS. 14A to 14C illustrate an input-output example of the output bit determination circuit 41. FIG. 14A shows block numbers of blocks; FIG. 14B, indices of the blocks; and FIG. 14C, the numbers of bits corresponding to the indices. An index corresponding to an input block number is outputted from the index table 803, and the number of output bits corresponding to the inputted index is outputted from the drain table 804.

For example, if block number "13" is inputted, index "1" is outputted from the index table 803, and the number of output bits "2D" is outputted from the drain table 804. If block number "23" is inputted, index "2" is outputted from the index table 803, and the number of output bits "3D" is outputted from the drain table 804. Note that constant "D" in the number of output bits means "bit-rate/frame-rate/72".

In the above description and the explanation of FIGS. 14A to 14C, one image is divided into twenty-four areas and one of four kinds of indices ("0", "1", "2" and "3") is allotted to each area. However, the present invention is not limited to this arrangement as long as an image is divided into a plurality of areas.

Next, the operation of the g-value determination circuit 43 will be described below.

Figure 15:
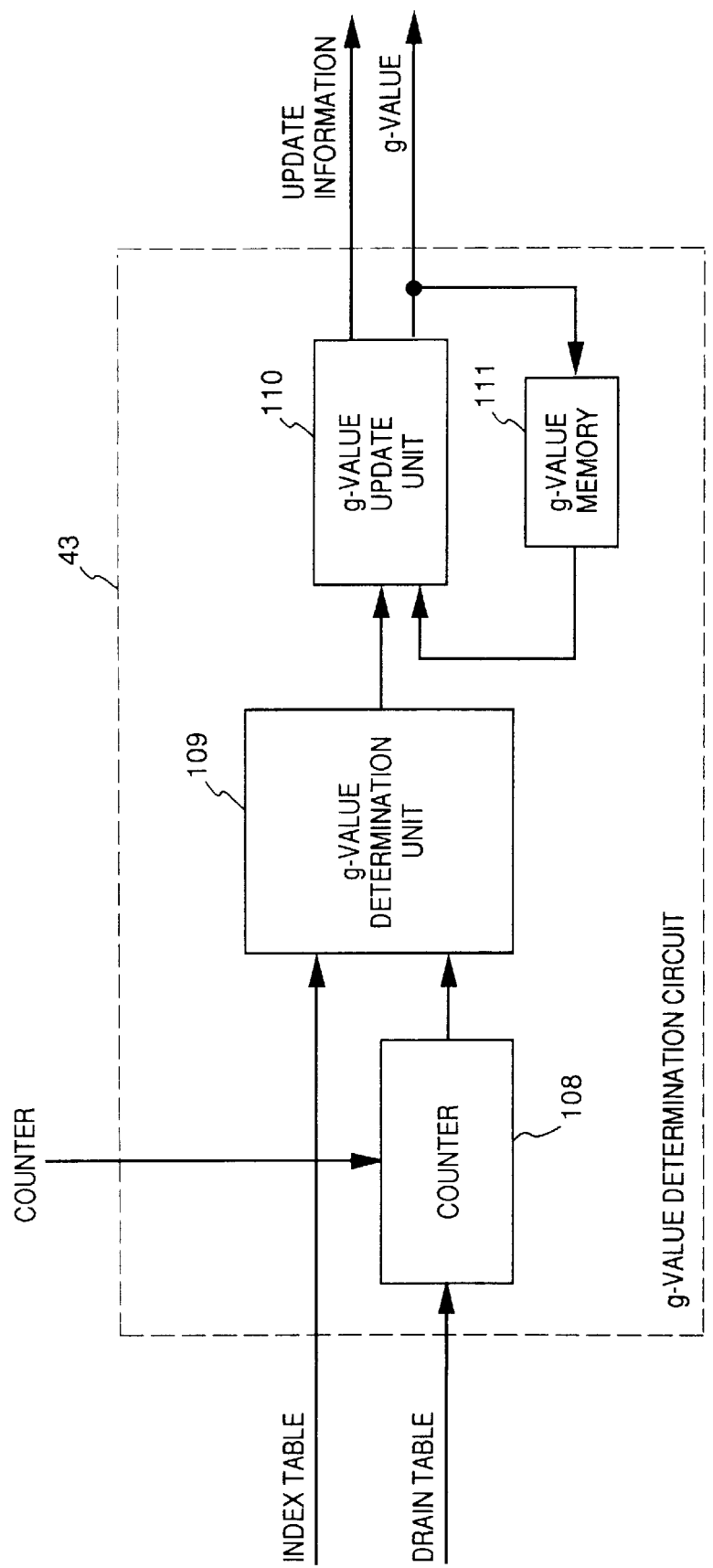
FIG. 15 is a block diagram showing the construction of a g-value determination circuit in the third embodiment.

FIG. 15 is a block diagram showing the construction of the g-value determination circuit 43.

In FIG. 15, the reference numeral 108 denotes a counter; 109, a g-value determination unit; 110, a g-value update unit; and 111, a g-value memory.

The counter 18 counts up a count value from the counter 22 and counts down the number of output bits from the output bit determination circuit 41.

The g-value determination circuit 109 outputs a g-value in accordance with the count value inputted from the counter 108.

Figure 16:
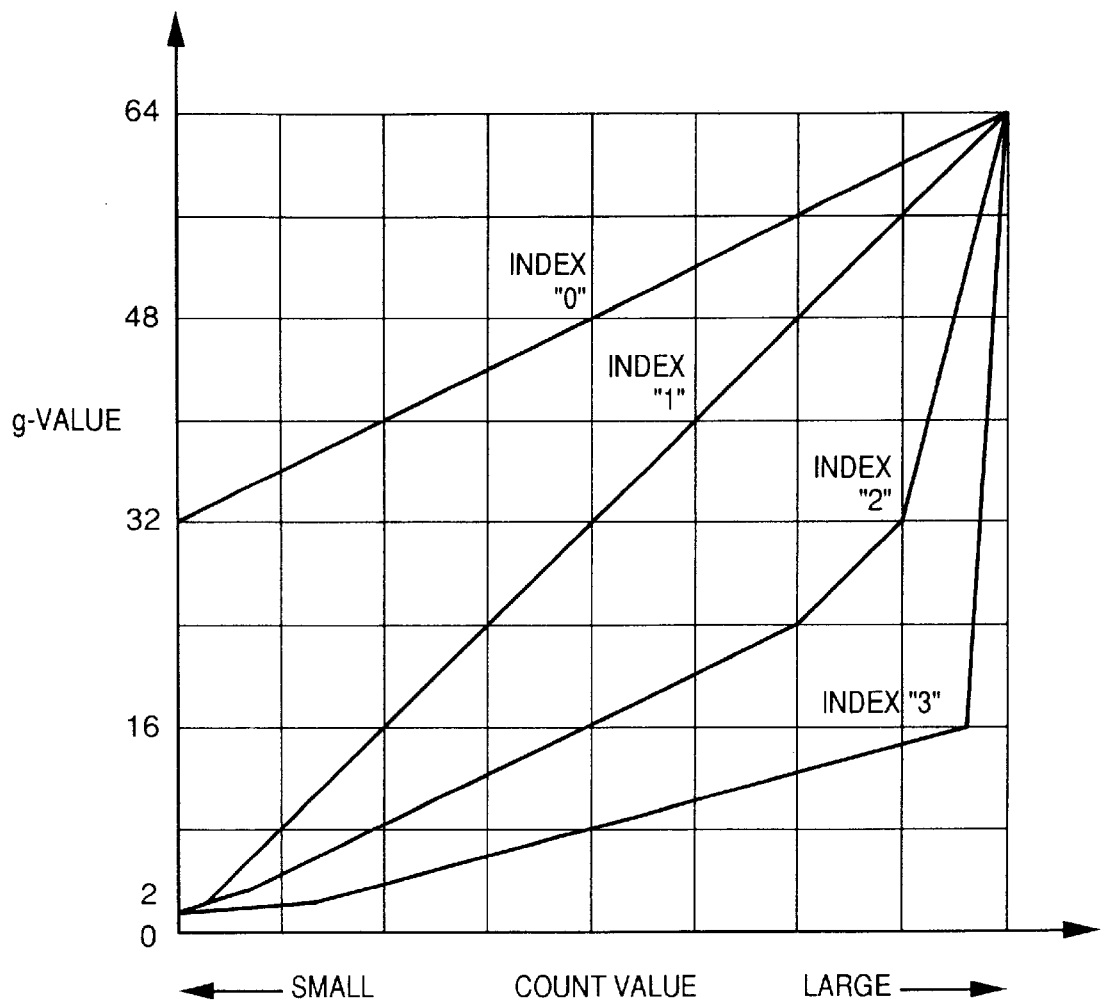
FIG. 16 illustrates an input-output example of the g-value determination circuit in the third embodiment.
Figure 18A:
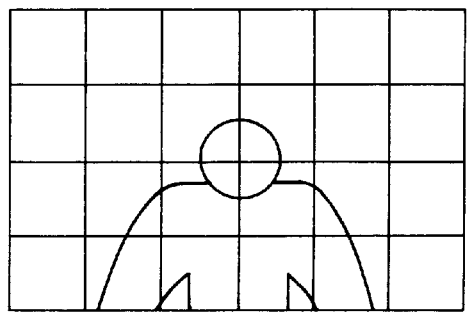
FIGS. 18A and 18B illustrate the relation between a block having a first size and a block having a second size.
Figure 18B:
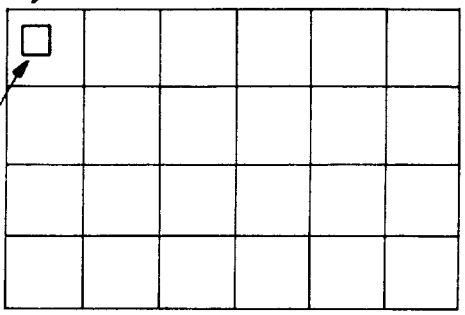

FIG. 16 shows an input-output example of the g-value determination unit 109, where a g-value in the axial direction (2 to 64) based on stored data information in the horizontal is outputted.

Note that in the above description and the explanation of FIG. 16, a g-value is 2 to 64, and an index is 0 to 3, however, the present invention is not limited to these values.

The g-value update unit 110 compares a g-value inputted from the g-value determination circuit 109 with a preceding g-value stored in the g-value memory 111, and outputs "0" if these values are the same, while outputs "1" if they are different. The g-value outputted from the g-value update unit 110 is inputted into the g-value memory 111 as well as into the scalar quantizer 4, the inverse quantizer 5 and the g-value encoder 9.

The g-value determination circuit 43 increases a g-value in various ways based on an index for outputting a g-value corresponding to a count value. For example, as shown in FIG. 16, it increases a g-value linearly with respect to an area of index "1". With respect to an area of index "3", it makes the inclination of increase small while the count value is small, but it makes the inclination of increase large while the count value is large.

Accordingly, in this embodiment, index "3" is allotted to a block having a comparatively large amount of information, and index "0" is allotted to a block having a comparatively small amount of information. Further, index "1" or "2" is allotted to a block having an intermediate amount of information. Quantization is performed to each block with a g-value corresponding to each index.

In the above description and the explanation of FIG. 16, an index is "0" to "3", however, this does not pose any limitation upon the present invention as long as the number of indices is plural.

As described above, according to this embodiment, the g-value determination circuit 43 determines a large g-value for an image having a small amount of information to reduce coding amount, while it determines a small g-value for an image having a large amount of information to increase coding amount, so that more code data can be provided to an area including more information. This arrangement can realize moving image coding without degradation of image quality by avoiding rough quantization to a block having a large amount of information and avoiding fine quantization to a block having a small amount of information. Further, the arrangement can stabilize output coding rate, since the number of output bits is determined corresponding to a partial change in coding amount.

FIG. 17 is a block diagram showing a system construction of peripheral devices including the image encoding apparatus as described in the embodiments of the present invention.

Reference numeral 2001 denotes a video camera comprising a CCD sensor; 2002, a frame memory for storing image data of each frame sequentially inputted from the video camera 2001; 2006, a memory controller for controlling the frame memory 2002 and generating a signal indicative of a frame number of input image data; 2003, a block cut-out circuit for outputting 8×8 pixel image data as DCT unit in DCT transformation by image encoder 2004; and 2007, a block number generator for generating data indicative of an area of divided twenty-four areas to which the block cut out by the block cut-out circuit 2003 belongs. The encoder 2004 encodes image data by the construction as shown in FIGS. 8 and 12. Numeral 2005 denotes a transmission unit for transmitting code data via a transmission line or a specific digital line.

In the above construction, parameters for coding can be controlled in accordance with position information indicating a position information on an image, i.e., index information indicating the degree of importance of image data.

Accordingly, more coding amount can be allotted to an important portion, and thus subjective image quality can be improved.

Further, the encoding apparatus side can omit an index table only by changing processing at the encoding apparatus side. Accordingly, simplification of the construction of the encoding apparatus and wide use of the system can be achieved.

In the present invention, the variable-length coding is not limited to Huffman coding, but it can be run-length coding. Further, the present invention can be applied to color image coding as well as black-and-white monochromatic image coding.

As described above, the present invention can provide coding method and apparatus for dividing an input moving image into plural areas in a predetermined number of blocks units, and determining a quantization step in accordance with information amount in a predetermined area.

The present invention can be applied to a system constituted by a plurality of devices, or to an apparatus comprising a simple device. Furthermore, it goes without saying that the invention is applicable also to a case where the object of the invention is attained by supplying a program to a system or apparatus.

The present invention is not limited to the above embodiments and various changes and modifications can be made within the spirit and scope of the present invention. Therefore, to apprise the public of the scope of the present invention, the following claims are made.

What is claimed is:

1. An image encoding apparatus having a function for controlling an amount of encoded image data, comprising:
   input means for inputting image data representing a picture;
   encoding means for encoding the image data for each block having a first size and generating encoded image data; and
   controlling means for controlling an encoding parameter for each block in accordance with an amount of the encoded image data,
   wherein said controlling means further controls the encoding parameter for each one block in accordance with predetermined index information for controlling the encoding parameter, corresponding to position information of the one block to be encoded, and the position information indicates a position of the one block in the picture.

2. The apparatus according to claim 1, further comprising memory means for storing information relating to which position is important in a frame.

3. The apparatus according to claim 1, further comprising means for storing a frame of the image data previously inputted by said input means.

4. The apparatus according to claim 1, further comprising means for encoding information relating to the encoding parameter.

5. The apparatus according to claim 1, wherein said input means is a video camera having a CCD sensor.

6. The apparatus according to claim 1, further comprising a buffer memory for storing encoded image data encoded by said encoding means.

7. The apparatus according to claim 6, wherein said controlling means monitors the amount of the encoded image data stored in said buffer memory.

8. The apparatus according to claim 1, wherein said encoding means includes quantizing means for quantizing the image data inputted by said input means.

9. The apparatus according to claim 8, wherein said controlling means controls a quantization parameter of said quantizing means.

10. The apparatus according to claim 8, wherein said encoding means includes an encoding circuit for encoding the image data quantized by said quantizing means into variable-length code data.

11. An image encoding apparatus having a function for controlling an amount of encoded image data, comprising:

input means for inputting image data representing a picture;

first encoding means for encoding a frame number of the image data input by said input means;

second encoding means for encoding the image data for each block having a first size and generating encoded image data; and controlling means for controlling an encoding parameter of said second encoding means for each block in accordance with an amount of the encoded image data, wherein said controlling means controls the encoding parameter for each one block further in accordance with position information of the one block to be encoded, and the position information indicates a position of the one block in the picture.

12. An image coding method for controlling an amount of encoded image data, comprising the steps of:

an input step of inputting image data representing a picture;

an encoding step of encoding the image data for each block having a first size and generating encoded image data; and a controlling step of controlling an encoding parameter for each block in accordance with the amount of the encoded image data, wherein in said controlling step, the encoding parameter for each one block is further controlled in accordance with predetermined index information for controlling the encoding parameter, corresponding to position information of the one block to be encoded, and the position information indicates a position of the one block in the picture.

13. The method according to claim 12, further comprising a step of storing a frame of the image data previously input in the input step.

14. The method according to claim 12, further comprising a step of encoding information relating to the encoding parameter.

15. The method according to claim 12, wherein the encoding step includes a quantizing step of quantizing the image data input in the input step.

16. The method according to claim 15, wherein the controlling step controls a quantization parameter of the quantizing step.

17. The method according to claim 15, wherein the encoding step encodes the image data quantized in the quantizing step into variable-length code data.

18. An image coding method for controlling an amount of encoded image data, comprising the steps of:

an input step of inputting image data representing a picture;

a storing step of storing information relating to which position is important in the picture;

an encoding step of encoding the image data for each block having a first size and generating encoded image data; and a controlling step of controlling an encoding parameter for each block in accordance with the amount of the encoded image data, wherein in said controlling step, the encoding parameter for each one block is further controlled in accordance with position information of the one block to be encoded, and the position information indicates a position of the one block in the picture.

19. An image coding method for controlling an amount of encoded image data, comprising the steps of:

an input step of inputting image data representing a picture;

a first encoding step of encoding a frame number of the image data input in the input step;

a second encoding step of encoding the image data for each block having a first size and generating encoded image data; and a controlling step of controlling an encoding parameter of the second encoding step for each block in accordance with the amount of the encoded image data, wherein in said controlling step, the encoding parameter for each one block is further controlled in accordance with position information of the one block to be encoded, and the position information indicates a position of the one block in the picture.

* * * * *

UNITED STATES PATENT AND TRADEMARK OFFICE
CERTIFICATE OF CORRECTION

PATENT NO. : 5,956,153
DATED : September 21, 1999
INVENTOR(S) : Yasuji Hirabayashi It is certified that error appears in the above-identified patent and that said Letters Patent is hereby corrected as shown below:

COLUMN 1:

Line 3, "continuation-in-part" should read --continuation--;
    Line 7, "[Field" should read --Field--; and "Invention]" should read --Invention--; and
    Line 11, "[Related Art]" should read --Related Art--.

COLUMN 2:

Line 41, "occurs" should read --occur--;
    Line 56, "amount" should read --the amount--; and
    Line 63, "Further" should read --A further--.

COLUMN 3:

Line 45, "and" should be deleted; and
    Line 47, "invention" should read --invention; and--.

UNITED STATES PATENT AND TRADEMARK OFFICE
CERTIFICATE OF CORRECTION

PATENT NO. : 5,956,153
DATED : September 21, 1999
INVENTOR(S) : Yasuji Hirabayashi It is certified that error appears in the above-identified patent and that said Letters Patent is hereby corrected as shown below:

COLUMN 4:

Line 67, "index "12"" should read --index "2"--.

COLUMN 5:

Line 48, "outputs" should read --it outputs--.

COLUMN 6:

Line 23, "Contrary," should read --On the contrary,--.

COLUMN 7:

Line 37, "outputs" should read --it outputs--.

COLUMN 8:

Line 9,  "element" should read --elements--; and
    Line 32, "an block" should read --a block--.

COLUMN 9:

Line 14, "outputs" should read --it outputs--.

UNITED STATES PATENT AND TRADEMARK OFFICE
CERTIFICATE OF CORRECTION

PATENT NO. : 5,956,153
DATED : September 21, 1999
INVENTOR(S) : Yasuji Hirabayashi It is certified that error appears in the above-identified patent and that said Letters Patent is hereby corrected as shown below:

COLUMN 10:

Line 5,    Close up right margin; and
       Line 6,    Close up left margin.

Signed and Sealed this

Thirtieth Day of January, 2001

Attest:

Q. TODD DICKINSON

Attesting Officer        Director of Patents and Trademarks